(12) United States Patent
Schmid

(10) Patent No.: US 6,972,951 B2
(45) Date of Patent: Dec. 6, 2005

(54) TOWER PC CONFIGURATION

(75) Inventor: Michael Schmid, Dillingen (DE)

(73) Assignee: Fujitsu Siemens Computers GmbH, Munich (DE)

( * ) Notice: Subject to any disclaimer, the term of this patent is extended or adjusted under 35 U.S.C. 154(b) by 81 days.

(21) Appl. No.: 10/437,824

(22) Filed: May 14, 2003

(65) Prior Publication Data

US 2003/0223195 A1 Dec. 4, 2003

(30) Foreign Application Priority Data

May 31, 2002 (DE) ................................ 102 24 273

(51) Int. Cl.⁷ ................................................ G06F 1/20
(52) U.S. Cl. ....................... 361/687; 361/688; 165/121; 174/15.2
(58) Field of Search ........... 361/683, 687–695; 165/121–126; 174/15.2, 252; 312/223.1, 223.2

(56) References Cited

U.S. PATENT DOCUMENTS

| | | | |
|---|---|---|---|
| 5,375,038 A | | 12/1994 | Hardt |
| 5,596,483 A | * | 1/1997 | Wyler .......................... 361/683 |
| 5,793,608 A | * | 8/1998 | Winick et al. .............. 361/695 |
| 5,813,243 A | * | 9/1998 | Johnson et al. ............. 361/687 |
| 5,852,547 A | * | 12/1998 | Kitlas et al. ................. 361/695 |
| 5,865,518 A | * | 2/1999 | Jarrett et al. ............. 312/223.2 |
| 6,002,586 A | | 12/1999 | Chen et al. |
| 2003/0156385 A1 | * | 8/2003 | Askeland et al. ........... 361/687 |
| 2003/0223194 A1 | * | 12/2003 | Schmid ....................... 361/687 |
| 2004/0004812 A1 | * | 1/2004 | Curlee et al. ................ 361/687 |
| 2004/0070936 A1 | * | 4/2004 | Coglitore et al. ........... 361/687 |
| 2004/0095723 A1 | * | 5/2004 | Tsai et al. .................... 361/695 |

FOREIGN PATENT DOCUMENTS

| | | |
|---|---|---|
| DE | 197 42 373 A1 | 4/1999 |
| DE | 100 13 863 A1 | 10/2001 |
| EP | 0 817 555 A2 | 1/1998 |

* cited by examiner

Primary Examiner—Lisa Lea-Edmonds

(74) Attorney, Agent, or Firm—Laurence A. Greenberg; Werner H. Stemer; Ralph E. Locher

(57) ABSTRACT

A design concept for a tower PC having an air grille formed on one side in a region of the power supply to achieve much more efficient cooling in the region of the power supply.

13 Claims, 2 Drawing Sheets

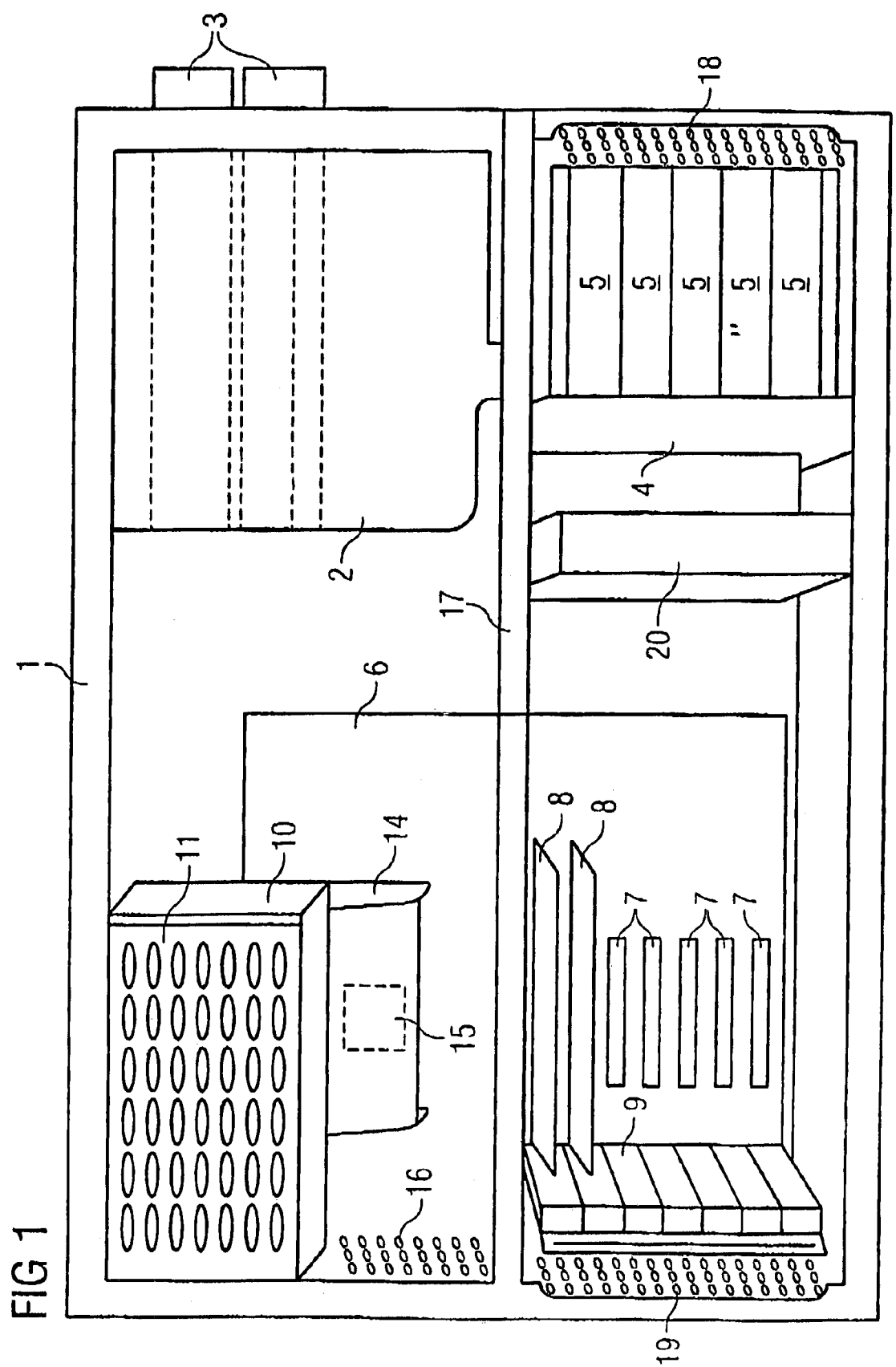

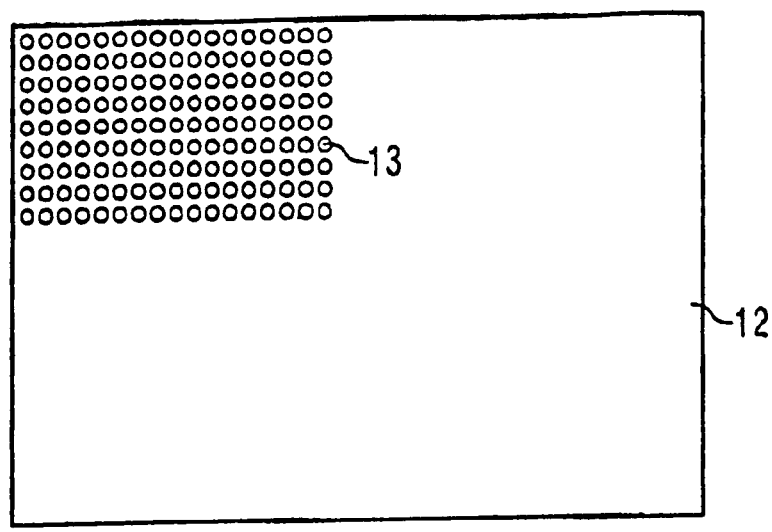
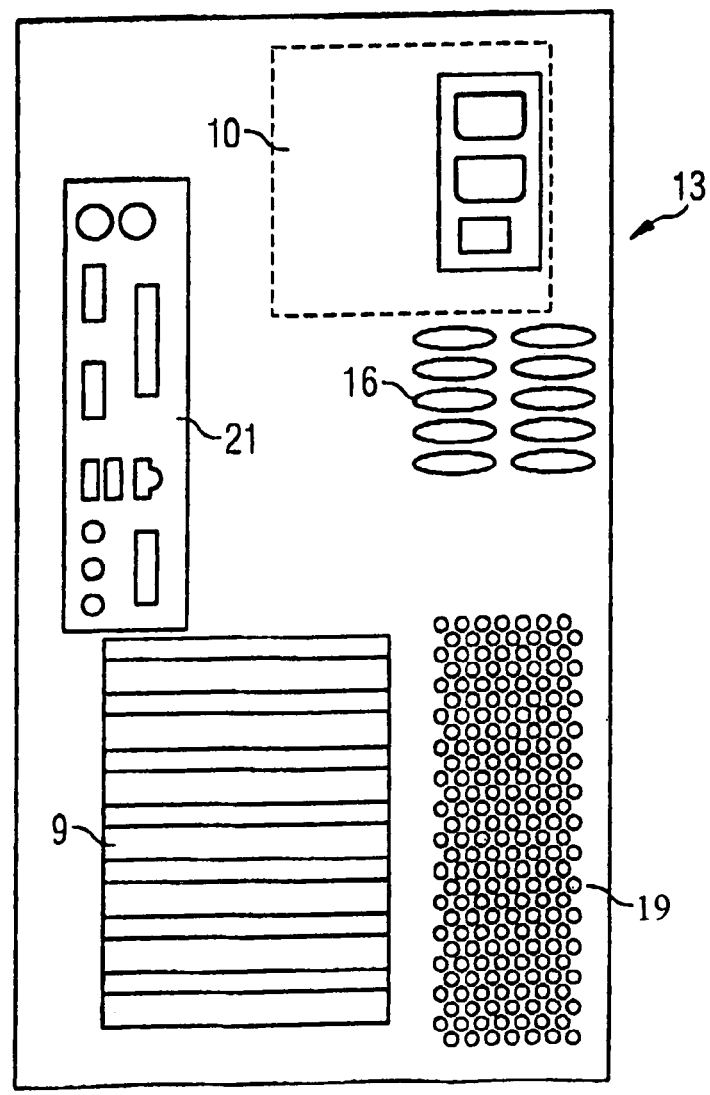

TOWER PC CONFIGURATION

BACKGROUND OF THE INVENTION

Field of the Invention

The invention relates to a design concept for a tower PC having a motherboard, a microprocessor, and a power supply with a fan in a computer casing.

To date, most tower PCs have been configured such that the cooling air is taken in at the front of the PC and is discharged at the back by a fan in the power supply.

As a result of components such as hard disks and processors becoming more and more powerful, the evolution of heat within the PC is also increasing.

In some cases, practice is now being changed to integrating an additional fan at the back for cooling purposes.

Similarly, special fans are being used on the processors.

The additional fans increase manufacturing costs and also increase the noise pollution by PC, and the MTBF (lifetime) is reduced.

SUMMARY OF THE INVENTION

It is accordingly an object of the invention to provide a tower PC configuration that overcomes the hereinaforementioned disadvantages of the heretofore-known devices of this general type and that allows a tower PC to be cooled more effectively.

With the foregoing and other objects in view, there is provided, in accordance with the invention, a tower PC configuration, including a computer casing, a motherboard disposed in the computer casing, a processor disposed at the motherboard, a power supply having a fan, the power supply disposed in the computer casing, and the computer casing having a side in a region of the power supply and a ventilation grille disposed at the side in the region of the power supply.

Because the ventilation grille can be configured to be much larger than at the back of the PC, a much greater cross-section is available for air to emerge, which means that the overall cooling for the interior of the PC can be made much more effective.

In accordance with another feature of the invention, maximum cooling can be achieved by forming the ventilation grille over the entire breadth of the power supply.

In accordance with a further feature of the invention, at the back, there is, advantageously, an air vent below the power supply, as in previously known models, and a fan forcing air outward can, likewise, be disposed on this air vent to increase efficiency.

In accordance with an added feature of the invention, there is provided an air guide shroud connected to the power supply, the air guide shroud passively cooling the processor.

In accordance with an additional feature of the invention, the computer casing has an interior and heat-generating components disposed in the interior and an airshield subdivides the interior to isolate the components from the power supply and from the processor.

In accordance with yet another feature of the invention, an airshield subdivides the interior to isolate cooling air from the power supply on the air guide shroud and on the processor from the components.

In accordance with yet a further feature of the invention, an airshield subdivides the interior to isolate the power supply and the processor.

In accordance with yet an added feature of the invention, an airshield subdivides the interior to isolate the power supply, the air guide shroud, and the processor.

In accordance with yet an additional feature of the invention, an airshield subdivides the interior to isolate the power supply, the air guide shroud, and the processor.

In accordance with again another feature of the invention, an airshield subdivides the interior and isolates cooling air from the power supply on the processor from the components.

In accordance with again a further feature of the invention, an airshield subdivides the interior and isolates cooling air from the power supply on the air guide shroud and on the processor from the components.

In accordance with again an added feature of the invention, the components are hard disks in the form of 3½" drives or plug-in cards.

In accordance with a concomitant feature of the invention, the computer casing has a front, a back, a second ventilation grille at the front, and a third ventilation grille at the back below the airshield and a fan is disposed in the computer casing between the second and third ventilation grilles and supplies a cooling air stream to cool the components.

Other features that are considered as characteristic for the invention are set forth in the appended claims.

Although the invention is illustrated and described herein as embodied in a tower PC configuration, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

BRIEF DESCRIPTION OF THE DRAWINGS

FIG. 1 is a perspective view from a side of a computer casing according to the invention open at the side;

FIG. 2 is a side elevational view of the casing of FIG. 1 in a closed condition; and FIG. 3 is a rear elevational view of the casing of FIG. 1.

DESCRIPTION OF THE PREFERRED EMBODIMENTS

Referring now to the figures of the drawings in detail and first, particularly to FIG. 1 thereof, there is shown a side view of a computer casing 1 for a tower PC whose front region contains a mounting cradle 2 for 5¼" drives 3 and, below that, a mounting cradle 4 for 3½" drives 5. The mounting cradle 4 for the 3½" drives 5 is disposed transversely with respect to the top mounting cradle 2, which means that the 3½" drives can be inserted transversely when the side has been removed. The 3½" drives installed at this point are generally the hard disks.

Behind the two mounting cradles 2 and 4, the side that is behind these has the motherboard 6 disposed on it substantially at right angles, and this motherboard has a series of slots 7 for plug-in cards 8 in its lower region.

The plug-in cards 8 are, thus, disposed horizontally and are fixed at the back of the computer casing 1 on a slot panel 9. The top half of the computer casing 1 contains a power supply 10 on the back at the top, the power supply 10 being disposed exactly behind the removed side of the computer casing 1. The power supply 10 has a ventilation grille 11 which points toward the removed side. Disposed behind the ventilation grille 11 is a non-illustrated ventilator or fan.

FIG. 2 shows a side 12 such as can be used for the computer casing shown in FIG. 1. The side 12 is distinguished in that it, likewise, has a ventilation grille 13 or a means of taking in air in the region of the power supply 10 or in the region of the ventilation grille 11 for the power supply 10, the means of taking in air, preferably, being formed over the entire breadth of the power supply 10.

The effect of a much larger surface area being available for air to emerge from the power supply 10 as a result of the ventilation grille 13 or 11 means that a much larger volume flow can be discharged from the interior of the PC through the power supply or the fan for the power supply 10, which increases cooling efficiency.

The large configuration of the ventilation grille 11 on the power supply or of the ventilation grille 13 on a removable side affords the further advantage that it is also possible to dispose two fans next to one another within the power supply.

In the exemplary embodiment shown in FIG. 1, the power supply 10 has an air guide shroud 14 connected thereto that extends over a processor 15 (shown only in dashes) on the motherboard 6.

In the exemplary embodiment shown, it is, thus, possible to dispense with a fan above the processor for the present evolution of heat from processors because an adequate cooling effect is achieved passively using the power supply.

For the cooling air to emerge, a further ventilation grille 16 is disposed below the power supply 10 in the usual manner.

To keep the evolution of heat from the hard disks, which are generally installed in the mounting cradle 4 as 3½" components, away from the processor, the computer has an airshield 17 that is disposed between the mounting cradles 2 and 4, extends over the entire breadth and length of the computer, and, thus, isolates the space containing the power supply and the part of the motherboard that holds the processor 15 from the 3½" drives 5 and from the plug-in cards 8.

To ensure adequate cooling for the 3½" drives 5 and for the plug-in cards 8, the front of the computer casing has a ventilation grille 18 and the back of the computer casing has a ventilation grille 19 next to the slot panel 9.

Below the airshield 17, either between the mounting cradle 4 for the 3½" components and the plug-in cards 8 or, alternatively, between the mounting cradle 4 and the front of the computer housing 1, there is a fan 20 that generates an air stream for the region below the airshield 17.

FIG. 3 shows the back of the computer casing shown in FIG. 1, with the power supply 10 being shown only in dashes.

As already shown in FIG. 1, a ventilation grille 16 for air to emerge in the top region is shown below the power supply 10, and, next to the slot panel 9, a further ventilation grille 19 for air to enter and emerge for the region below the airshield 17 is shown.

Above the slot panel 9, there is a plug panel 21 for the connections from external devices.

I claim:

1. A tower PC configuration, comprising:
   a computer casing,
   a motherboard disposed in said computer casing;
   a processor disposed at said motherboard;
   a power supply having a fan and an air guide shroud passively cooling said processor, said power supply disposed in said computer casing; and
   said computer casing having:
      a front;
      a back;
      a side not being said front or said back; and
      a ventilation grille or air vent disposed at said side in a region of said power supply.

2. The tower PC configuration according to claim 1, wherein said ventilation grille or air vent is formed over an entire breadth of said power supply.

3. The tower PC configuration according to claim 1, wherein said computer casing has a second ventilation grille or air vent at said back below said power supply.

4. A tower PC configuration, comprising:
   a computer casing having a front, a back, and a side not being said front or said back;
   a motherboard disposed in said computer casing;
   a processor disposed at said motherboard;
   a power supply having a fan, said power supply disposed in said computer casing;
   an air guide shroud connected to said power supply, said air guide shroud passively cooling said processor; and
   a ventilation grille or air vent disposed at said side in a region of said power supply.

5. A tower PC configuration, comprising:
   a computer casing having an interior, heat-generating components disposed in said interior, a front, a back, and a side not being said front or said back;
   a motherboard disposed in said computer casing;
   a processor disposed at said motherboard;
   a power supply having a fan, said power supply disposed in said computer casing; and
   an airshield subdividing said interior for isolating said heat-generating components from said power supply and from said processor;
   a ventilation grille or air vent disposed at said side in a region of said power supply.

6. A tower PC configuration, comprising:
   a computer casing having an interior, a front, a back, and a side not being said front or said back;
   a motherboard disposed in said computer casing;
   a processor disposed at said motherboard;
   a power supply having a fan, said power supply disposed in said computer casing;
   an airshield subdividing said interior for isolating said power supply and said processor; and
   a ventilation grille or air vent disposed at said side in a region of said power supply.

7. The tower PC configuration according to claim 4, wherein:
   said computer casing has an interior; and
   an airshield subdivides said interior to isolate said power supply, said air guide shroud, and said processor.

8. The tower PC configuration according to claim 5, wherein said components are selected from the group consisting of hard disks in the form of 3½" drives and plug-in cards.

9. The tower PC configuration according to claim 5, wherein:
   said computer casing has a second ventilation grille or air vent at said front, and a third ventilation grille or air vent at said back below said airshield; and
   a fan is disposed in said computer casing between said second and third ventilation grilles or air vents and supplies a cooling air stream to cool said components.

10. The tower PC configuration according to claim 6, wherein:
   front, and a third ventilation grille at said back below said airshield; and
   a fan is disposed in said computer casing between said second and third ventilation grilles and supplies a cooling air stream to cool a space therebetween.

11. A tower PC configuration, comprising:
   a computer casing;
   a motherboard disposed in said computer casing;
   a processor disposed at said motherboard;
   a power supply having a fan, said power supply disposed in said computer casing;
   an air guide shroud connected to said power supply, said air guide shroud passively cooling said processor, and
   said computer casing having:
      a back;
      a side in a region of said power supply;
      a first ventilation grille or air vent disposed at said side in said region of said power supply; and
      a second ventilation grille or air vent at said back below said power supply.

12. A tower PC configuration, comprising:
   a computer casing;
   a motherboard disposed in said computer casing;
   a processor disposed at said motherboard;
   a power supply having a fan, said power supply disposed in said computer casing;
   heat-generating components disposed in said computer casing;
   an air guide shroud connected to said power supply, said air guide shroud passively cooling said processor;
   said computer casing having:
      a back;
      an interior;
      a side in a region of said power supply;
      a first ventilation grille or air vent disposed at said side in said region of said power supply; and
      a second ventilation grille or air vent at said back below said power supply; and
   an airshield subdividing said interior to isolate cooling air from said power supply on said air guide shroud and on said processor from said components.

13. The tower PC configuration according to claim 12, wherein:
   said computer casing has a front, a third ventilation grille or air vent at said front, and a fourth ventilation grille or air vent at said back below said airshield; and
   a fan is disposed in said computer casing between said third and fourth ventilation grilles and supplies a cooling air stream to cool said components.

* * * * *